(12) United States Patent
Fukuda

(10) Patent No.: US 6,544,488 B1
(45) Date of Patent: Apr. 8, 2003

(54) METHOD FOR DECOMPOSING A CLEANING GAS FOR CLEANING A FILM DEPOSITION CHAMBER

(75) Inventor: Tatsuo Fukuda, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/505,141

(22) Filed: Feb. 15, 2000

(30) Foreign Application Priority Data

Jun. 14, 1999 (JP) .............................................. 11-167343

(51) Int. Cl.$^7$ .......................... B01D 53/46; B01D 53/54
(52) U.S. Cl. ........................ 423/210; 422/168; 423/235; 423/DIG. 10
(58) Field of Search ................ 422/168, 206; 423/235, 240 R, 490, 492, DIG. 10; 427/585, 444

(56) References Cited

U.S. PATENT DOCUMENTS 5,326,723 A * 7/1994 Petro et al. .................. 438/685

* cited by examiner

Primary Examiner—Wayne A. Langel
Assistant Examiner—Maribel Medina
(74) Attorney, Agent, or Firm—McDermott, Will & Emery

(57) ABSTRACT

A predetermined gas, which differs from a cleaning gas and is not required to be decomposed for evacuation, is introduced into a film deposition chamber provided upstream of a main process, wherein a cleaning gas for cleaning the film deposition chamber is introduced into the film deposition chamber, and plasma is developed to decompose the cleaning gas, thereby cleaning up the film deposition chamber. Plasma is developed before introduction of the cleaning gas. Alternatively, subsequent to the main process, a predetermined gas, which differs from the cleaning gas and is not required to be decomposed for evacuation, is introduced into the film deposition chamber, and plasma development is continued from the main process. A cleaning gas may be evacuated after substantially totally decomposed.

9 Claims, 8 Drawing Sheets

METHOD FOR DECOMPOSING A CLEANING GAS FOR CLEANING A FILM DEPOSITION CHAMBER

BACKGROUND OF THE INVENTION

1. Field of the Invention

The present invention relates to a method of decomposing cleaning gas used for cleaning a film deposition chamber, in which a film for forming an electronic circuit device is deposited on a wafer. More particularly, the present invention relates to a method of decomposing cleaning gas used in a thin film deposition process for forming a functional component typified by a semiconductor device or a liquid crystal display device.

2. Background Art

A process for fabricating an electronic device, such as a semiconductor device or a liquid crystal element, has inevitably includes a process of depositing a thin film within a thin film deposition chamber. Such film may be a silicon oxide (SiO) film, a silicon nitride (SiN) film, a silicon (Si) film, a tungsten (W) film, or a tungsten silicide (WSi) film.

In the thin film deposition chamber, when a thin film is deposited on an element which is under manufacture, same film is gradually accumulated and stored within the thin film deposition chamber. Such accumulated film may be exfoliated from the chamber and become the source of dust, thereby involving a risk of increasing the amount of defects in the film used for forming an element. In order to prevent generation of the dust, the interior of the thin film deposition chamber must be periodically cleaned.

The cleaning gas is eventually emitted to the atmosphere. For example, in the case of nitrogen trifluoride ($NF_3$), in a final emission phase the concentration of $NF_3$ must be controlled to an allowable level of the order of ppm.

FIG. 8 is a descriptive view for describing the concept of conventional plant-wide gas exhaust facilities.

In FIG. 8, reference numeral 10 designates a thermal CVD system for depositing a tungsten film; 21 designates a pump; 22 designates an $NF_3$ gas decomposer; 23 designates a plant-wide decomposer; and 24 and 25 designate other thin film deposition apparatus.

As shown in FIG. 8, an actual plant is equipped with a number of thin film deposition systems 10, 24, and 25, and the respective thin film deposition systems 10, 24, and 25 emit gases. The thus-emitted gases are collected in the plant-wide decomposer 23 connected to the thin film deposition systems 10, 24, and 25, where the gases are subjected to decomposing until they are brought to a safe exhaust level and are discharged to the atmosphere.

In this case, for example, the gas emitted from the CVD system 10 is decomposed by means of the stand-alone $NF_3$ gas decomposer 22 which is specifically designed for removing $NF_3$ and is disposed between the CVD system 10 and the plant-wide decomposer 23. After having been decomposed to a safe exhaust level at which it can be mixed with other gases, the gas is emitted to the plant-wide decomposer 23.

If no plasma is developed in the CVD system 10, the film deposition room cleaning gas is not decomposed, and the $NF_3$ gas decomposer 22 is required to decompose the cleaning gas.

For example, in the case of a thin film deposition apparatus, such as the CVD system 10, at the time of purchase of the thin film deposition apparatus, the user must purchase a standalone gas decomposer specifically designated for use with the thin film deposition apparatus. Further, the user must bear costs for operating the gas decomposer.

SUMMARY OF THE INVENTION

The present invention has been conceived to solve these problems, and the object of the present invention is to provide a processing method which prevents emission of gas to be filtered at the time of cleaning of a processing system, reduces the toxicity of exhaust gas from a plant, and diminishes the necessity for an apparatus designated for filtering purpose.

According to one aspect of the present invention, in a method of decomposing a cleaning gas introduced into a film deposition chamber, a predetermined gas is introduced into the film deposition chamber and a plasma is developed before introduction of a cleaning gas in a preliminary process. The predetermined gas is different from the cleaning gas and is not required to be decomposed for evacuation. In a main process subsequent to the preliminary process, the cleaning gas is introduced into the the film deposition chamber, and plasma is developed to decompose the cleaning gas for cleaning a deposited film in the film deposition chamber, whereby the cleaning gas is evacuated while being substantially totally decomposed.

According to another aspect of the present invention, in a method of decomposing a cleaning gas introduced into a film deposition chamber, the cleaning gas is introduced into the the film deposition chamber, and plasma is developed to decompose the cleaning gas for cleaning a deposited film in the film deposition chamber in a main process. In a subsequent process, a predetermined gas is introduced into the film deposition chamber and development of plasma is continued subsequent to the main process. The predetermined gas is different from the cleaning gas and is not required to be decomposed for evacuation, whereby the cleaning gas is evacuated while being substantially totally decomposed.

In another aspect, the preliminary process, the main process and the subsequent process as described above may be combined in series.

Other and further objects, features and advantages of the invention will appear more fully from the following description.

DETAILED DESCRIPTION OF THE PREFERRED EMBODIMENTS

Figure 1:
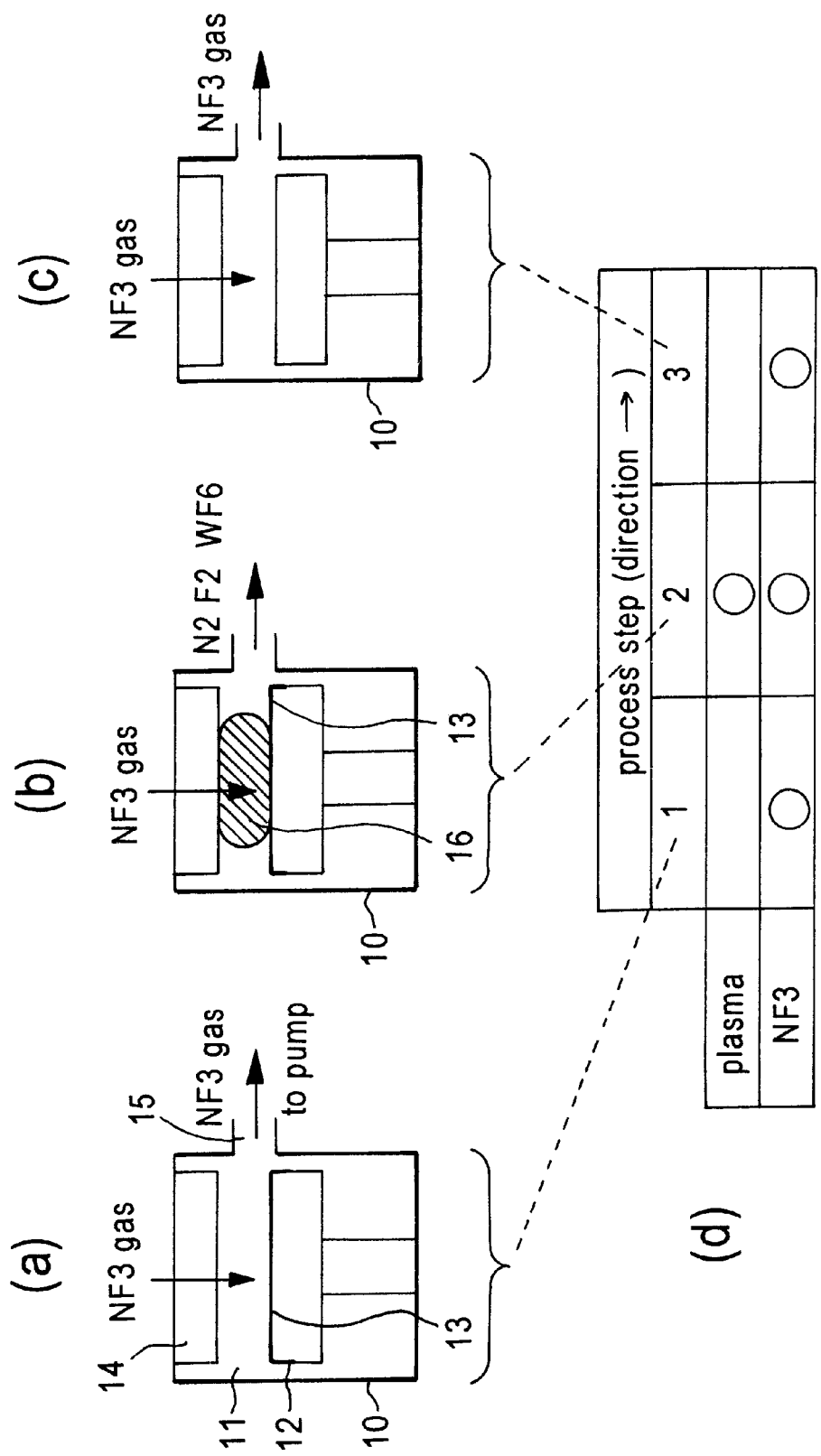
FIGS. 1(a) through (d) shows descriptive views for describing a conventional method for cleaning a film deposition chamber, for comparison with a first embodiment of the present invention.

Preferred embodiments of the present invention will be described hereinbelow by reference to the accompanying drawings. Throughout the drawings, like reference numerals are assigned to like or corresponding elements, and repetition of their explanations may be simplified or omitted for brevity.

First Embodiment

A first embodiment of the present invention will be described in comparison with a conventional example, in which an application of the present invention to a thermal CVD system for depositing a tungsten (W) film is taken as an example.

FIG. 1 shows descriptive views for describing a conventional method for comparison. Processing is performed in sequence of (a), (b) and (c) in FIG. 1. (d) in FIG. 1 is a table showing comparison of the respective processing steps in terms of development of plasma and inflow of $NF_3$ gas.

An explanation will first be given of a conventional cleaning method. In a process prior to a cleaning process, a tungsten film is deposited on a wafer within a CVD system 10 for depositing a tungsten (W) film (hereinafter referred to simply as a "CVD system 10"), and then the wafer having the tungsten film deposited thereon is withdrawn from the CVD system 10.

When the CVD system 10 is cleaned, $NF_3$ gas is introduced into a film deposition chamber 11 in step 1 shown in (a) in FIG. 1. In step 1, $NF_3$ gas is emitted from the CVD system 10 by way of an exhaust port 15 without being decomposed. Reference numeral 12 designates a heater for heating a wafer; 13 designates a tungsten film deposited on the heater 12; and 14 designates a gas head for introducing cleaning gas ($NF_3$ gas is employed in this embodiment).

In step 2 shown in (b) of FIG. 1, plasma 16 is developed in $NF_3$ gas, whereby $NF_3$ gas is decomposed into $N_2$ and $F_2$ ions. The thus-decomposed elements react with tungsten to form $WF_6$, with the result that the tungsten film 13 deposited on the heater 12 is decomposed, removed, and cleaned.

In step 3 shown in (c) of FIG. 1, development of plasma is stopped, and then the supply of $NF_3$ gas is stopped.

(d) of FIG. 1 shows the state of development of plasma and the state of introduction of $NF_3$ gas in the three respective processing steps. As shown in (d) of FIG. 1, under the conventional method, there is a case where $NF_3$ gas is introduced into the CVD system 10 while no plasma is being developed. In this case, $NF_3$ gas is emitted from the film deposition chamber 11 by way of the exhaust port 15 without being decomposed.

Figure 8:
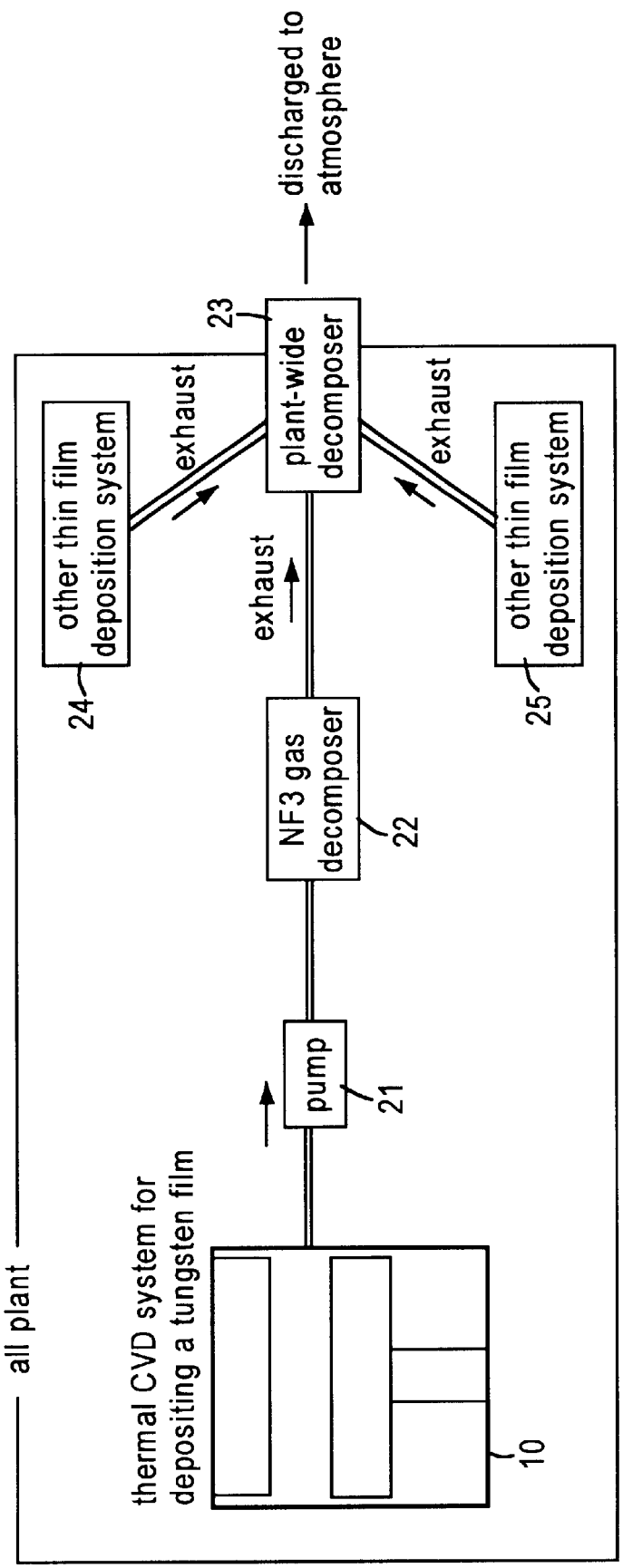
FIG. 8 is a descriptive view for describing the concept of conventional plant-wide gas exhaust facilities.

Therefore, as shown in FIG. 8, a designated $NF_3$ gas decomposer 22 is needed to follow the pump 21 which evacuates $NF_3$ gas by means of suction.

In order to eliminate the necessity for the $NF_3$ gas decomposer 22, the present embodiment is directed toward preventing emission of cleaning gas, such as $NF_3$ gas, that is not decomposed.

Figure 2:
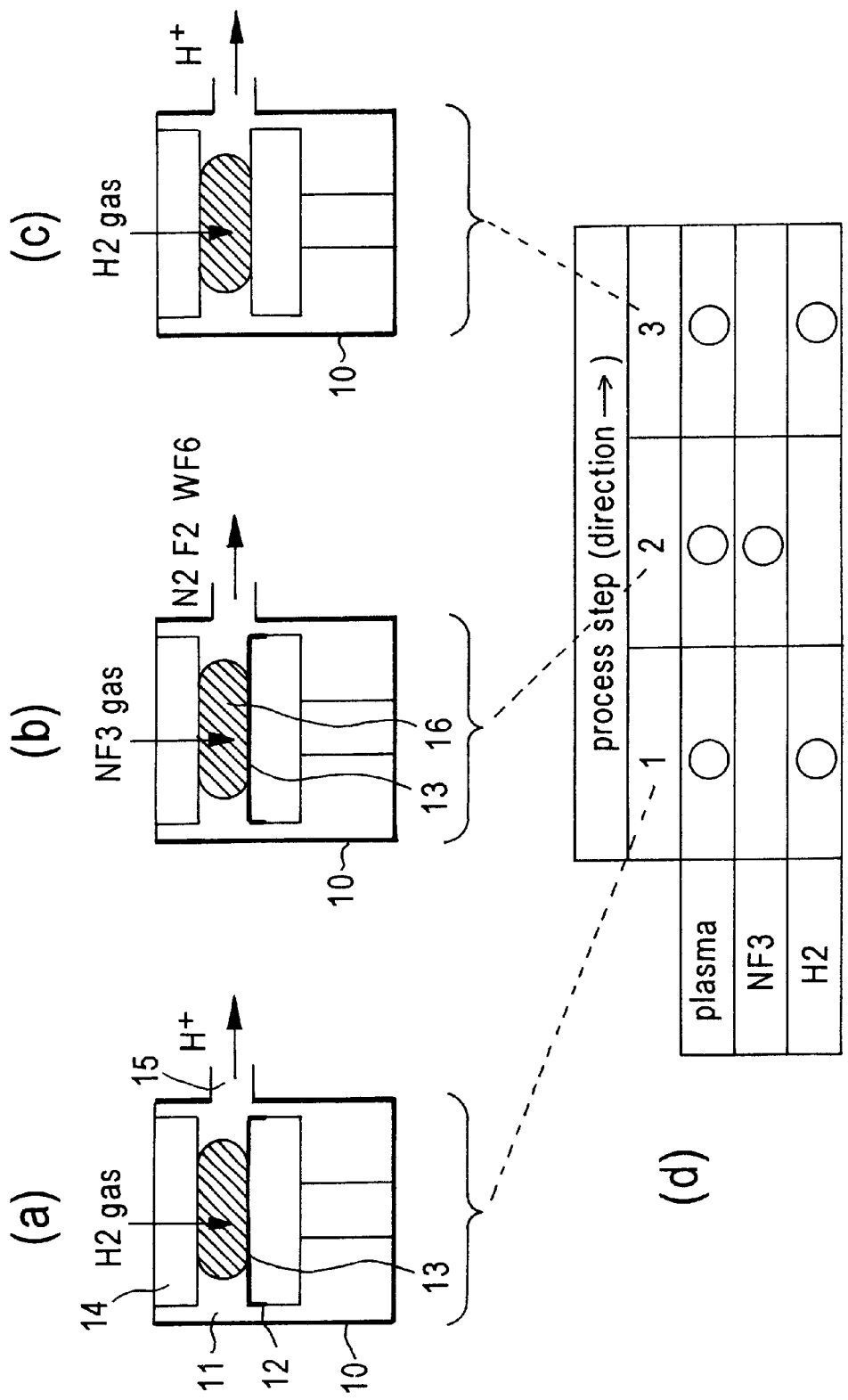
FIGS. 2(a) through (d) show views for describing a method of decomposing a cleaning gas introduced into a film deposition chamber for cleaning the film deposition chamber according to a first embodiment of the present invention.

FIG. 2 shows views for describing a method of eliminating cleaning gas according to a first embodiment of the present invention.

In the present embodiment, in a process prior to the cleaning process, a tungsten film has been deposited on a wafer within the CVD system 10, and then the wafer having the tungsten film deposited thereon is withdrawn from the CVD system 10.

In the cleaning process where the CVD system 10 is cleaned, gas other than the cleaning gas; that is, $H_2$ gas for example, which is less likely to damage the interior of the film deposition chamber 11 as a result of plasma development, is introduced into the CVD system 10 in step 1 (a preceding process) shown in (a) of FIG. 2. Plasma is developed substantially simultaneously with introduction of the $H_2$ gas. Reference numeral 12 designates a heater for heating a wafer; 13 designates a tungsten film deposited on the heater 12; 14 designates a gas head for introducing a cleaning gas ($H_2$ gas is employed in this embodiment) or another gas; and 15 designates an exhaust port.

The thus-introduced $H_2$ gas is decomposed into $H^+$ ions by means of plasma development, and the $H^+$ ions are emitted by way of the exhaust port 15.

In step 2 (main process) shown in (b) of FIG. 2, $NF_3$ gas is introduced into the CVD system 10 in lieu of $H_2$ gas. Plasma 16 is developed in the $NF_3$ gas, whereby the gas is decomposed into $N_2$ and $F_2$ ions. The ions react with tungsten to form $WF_6$. In this way, the tungsten film 13 deposited on the heater 12 is decomposed and removed, thereby cleaning the film deposition chamber 11.

When the cleaning operation is terminated, in step 3 (subsequent process) shown in (c) of FIG. 2, the introduction of $NF_3$ gas is stopped, and $H_2$ gas is introduced into the CVD system 10 in lieu of $NF_3$ gas. The thus-introduced $H_2$ gas is decomposed into $H^+$ ions by means of plasma development, and the $H^+$ ions are emitted. Subsequently, development of plasma is stopped after the residual $NF_3$ gas has been evacuated from the inside of the film deposition chamber 11. During steps 1 through 3, plasma is developed continuously.

(d) of FIG. 2 shows the state of plasma development and the state of introduction of $NF_3$ gas in the three processing steps. As shown in (d) of FIG. 2, in the present embodiment, plasma is developed before introduction of $NF_3$ gas and is continued for a while after introduction of $NF_3$ gas has been stopped. Accordingly, the $NF_3$ gas is completely decomposed.

As mentioned above, in the present embodiment, the cleaning gas can be decomposed by utilization of the film deposition chamber 11. More specifically, the cleaning gas is introduced into the film deposition chamber 11 only while plasma is being developed in the CVD system 10.

In the present embodiment, in order to prevent $NF_3$ gas from being evacuated without being decomposed, gas other than the cleaning gas; for example, $H_2$ gas, which is less likely to damage the interior of the film deposition chamber 11 as a result of plasma development is introduced, and plasma is developed substantially simultaneously with introduction of $H_2$ gas.

During a period in which $NF_3$ gas is introduced into the film deposition chamber 11, plasma is inevitably developed, to thereby prevent evacuation of $NF_3$ gas that has not been decomposed.

Therefore, there is eliminated a necessity for providing the dedicated $NF_3$ gas decomposer downstream of the CVD system 10 in the plant decomposing system.

Figure 7:
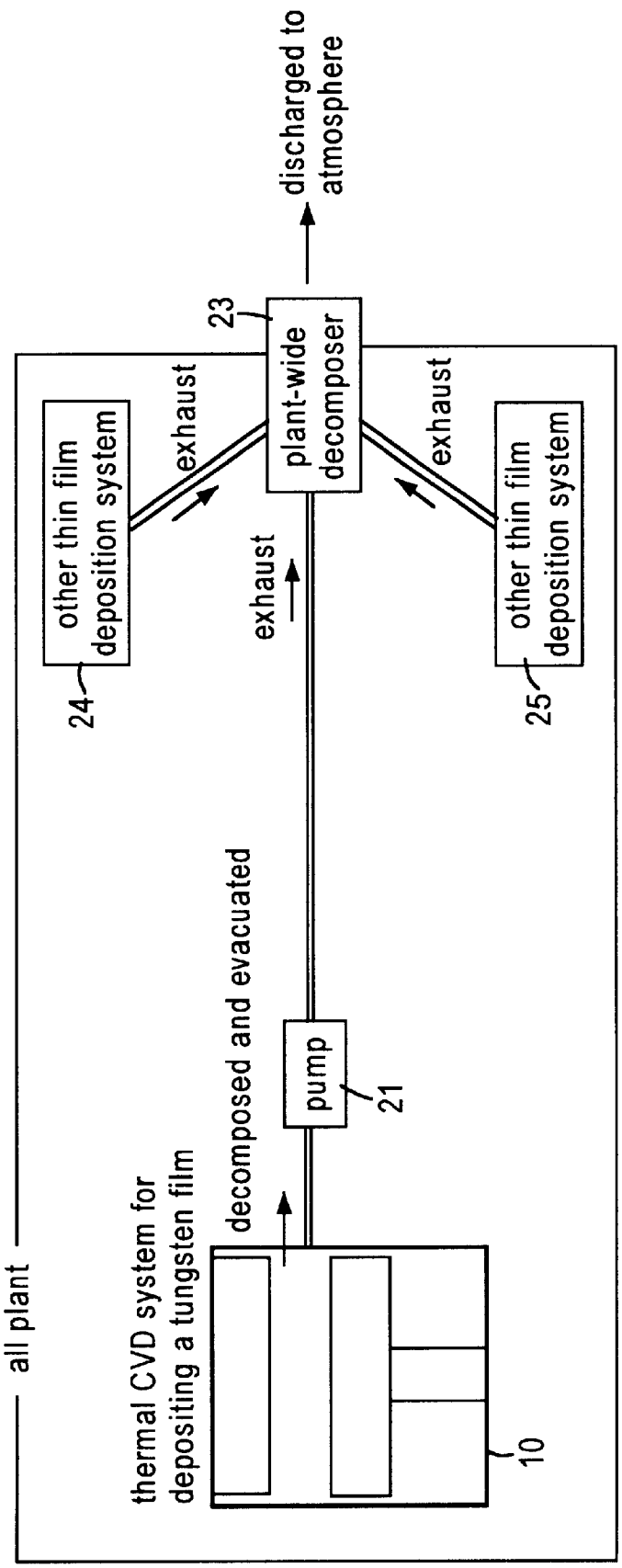
FIG. 7 is a conceptual view showing an outline of structure of a plant decomposing system according to the present invention.

FIG. 7 is a conceptual view showing the outline of structure of the plant decomposing system according to the first embodiment. As shown in FIG. 7, gas is evacuated from the CVD system 10 through use of the pump 21, and the thus-evacuated gas can be sent directly to the plant-wide decomposer 23. Reference numerals 24 and 25 designate other thin film deposition systems, which do not originally require a designated gas decomposer respectively and connected to the common plant-wide decomposer 23.

According to the first embodiment, there can be prevented evacuation of the cleaning gas that is required to be decomposed during the cleaning of the film deposition chamber, thus reducing the toxicity of exhaust gas.

Further, there can be eliminated a necessity for a dedicated gas decomposer specifically designated for the type of cleaning gas and provided downstream of the CVD system.

Thus, the plant decomposing system does not require a dedicated gas decomposer or composers for individual film deposition systems, thus contributing to a reduction in facility costs.

Second Embodiment

A second embodiment of the present invention will be described in comparison with a conventional example, in which an application of the present invention to a thermal CVD system for depositing a tungsten (W) film is taken as an example.

Figure 3:
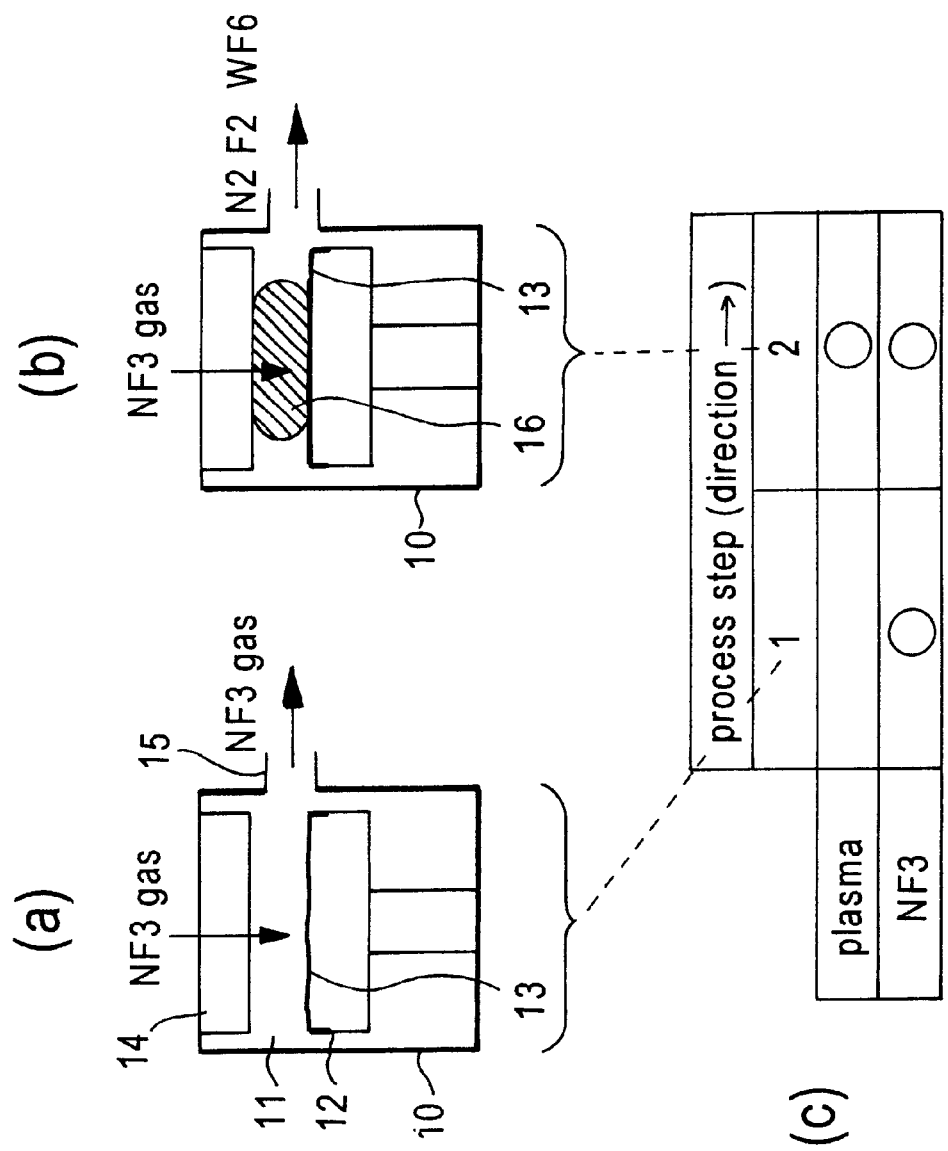
FIGS. 3(a) through (c) show descriptive views for describing a conventional method for cleaning a film deposition chamber, for comparison with a second embodiment of the present invention.

FIG. 3 show descriptive views for describing a conventional method for comparison. Processing is performed in sequence from (a) to (b) of FIG. 3. (c) in FIG. 3 is a table showing comparison in respective two processing steps in terms of development of plasma and inflow of $NF_3$ gas.

According to the conventional method, a tungsten film has been deposited on a wafer within the CVD system 10, and thereafter the wafer having the tungsten film deposited thereon is withdrawn from the CVD system 10.

In order to clean the CVD system 10, $NF_3$ gas is introduced into the film deposition chamber 11 in step 1 shown in (a) of 3. In step 1, $NF_3$ gas is evacuated from the CVD system 10 by way of the exhaust port 15 without being decomposed.

Plasma 16 is developed in $NF_3$ gas in step 2 shown in (b) of FIG. 3, so that $NF_3$ gas is decomposed into $N_2$ and $F_2$ ions. The thus-decomposed ions react with tungsten to form $WF_6$ or like compounds. Accordingly, the tungsten film 13 deposited on the heater 12 is eliminated. Subsequently, development of plasma and introduction of $NF_3$ gas are stopped.

(c) of FIG. 3 is a table showing the state of development of plasma and the state of introduction of $NF_3$ gas in the two respective processing steps. As shown in (c) of FIG. 3, under the conventional method, there is a case where $NF_3$ gas is introduced into the film deposition chamber 11 while no plasma is being developed. In this case, $NF_3$ gas is evacuated from the film deposition chamber 11 by way of the exhaust port 15 without being decomposed.

Therefore, as shown in FIG. 8, the designated $NF_3$ gas decomposer 22 must follow the pump 21 which excavates $NF_3$ gas by means of suction.

In order to eliminate the necessity for the $NF_3$ gas decomposer 22, the second embodiment of the present invention is directed toward preventing the cleaning gas, such as $NF_3$ gas, from being evacuated without being decomposed.

Figure 4:
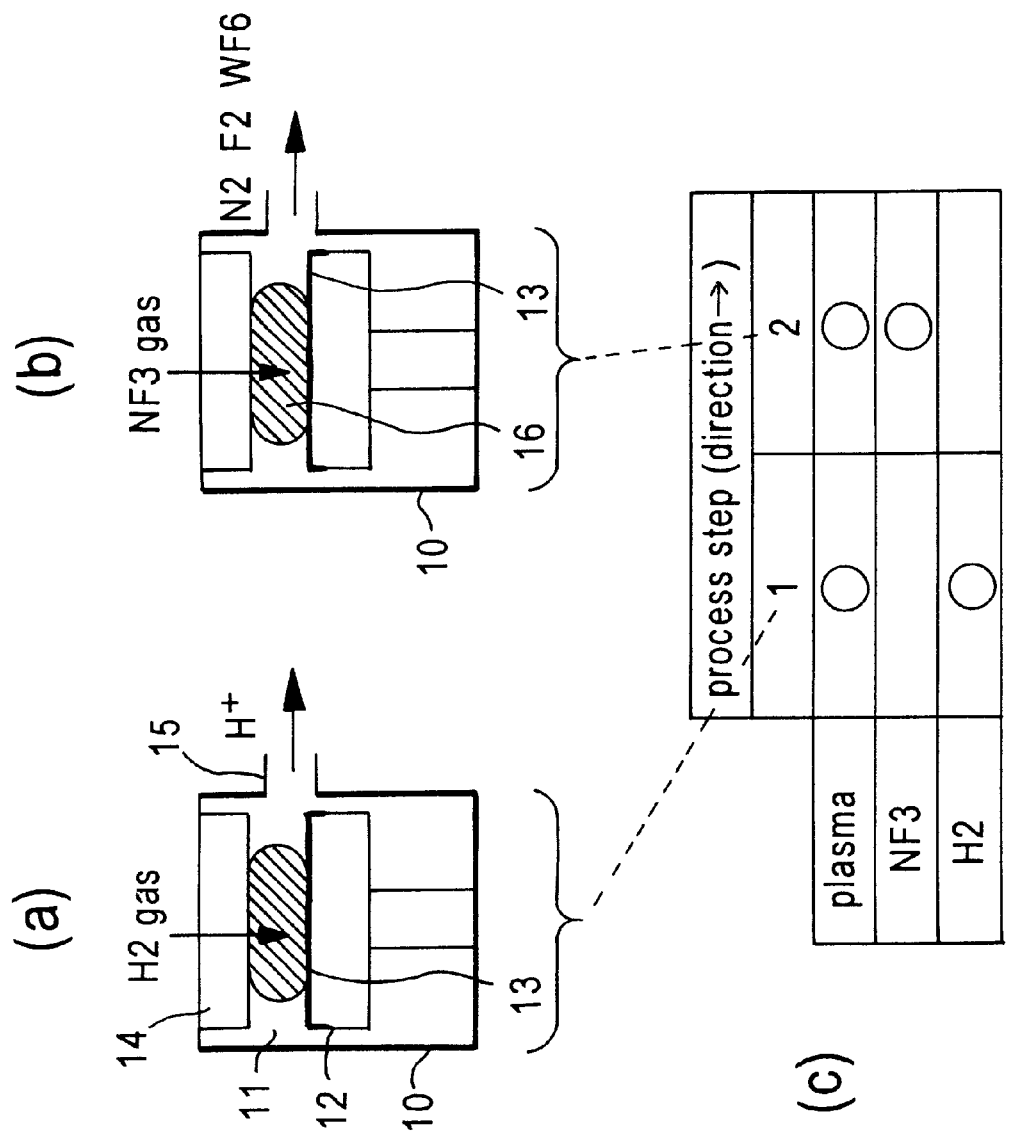
FIGS. 4(a) through (c) show views for describing a method of decomposing a cleaning gas introduced into a film deposition chamber for cleaning the film deposition chamber according to the second embodiment.

FIG. 4 show views for describing a method of eliminating cleaning gas according to the second embodiment.

In the present embodiment, after a tungsten film has been deposited on a wafer within the CVD system 10 prior to a cleaning process, the wafer having the tungsten film deposited thereon is withdrawn from the CVD system 10.

When the CVD system 10 is cleaned in the cleaning process, gas other than the cleaning gas; for example, $H_2$ gas, which is less likely to damage the interior of the film deposition chamber 11 as a result of plasma development, is introduced into the CVD system 10 in step 1 (a preceding process) shown in (a) of FIG. 4. Plasma is developed substantially simultaneously with introduction of the $H_2$ gas. The thus-introduced $H_2$ gas is decomposed into $H^+$ ions by means of plasma development, and the $H^+$ ions are emitted by way of the exhaust port 15.

In step 2 (main process) shown in (b) FIG. 4, $NF_3$ gas is introduced into the film deposition chamber 11 in lieu of $H_2$ gas. Plasma 16 is developed in $NF_3$ gas, whereby the gas is decomposed into $N_2$ and $F_2$ ions. The ions react with tungsten to form $WF_6$. In this way, the tungsten film 13 deposited on the heater 12 is decomposed and removed, thus cleaning the film deposition chamber 11.

In order to terminate the cleaning operation, introduction of $NF_3$ gas is stopped, and plasma development is stopped when residual $NF_3$ gas that has not reacted is found to have been eliminated.

(c) in FIG. 4C shows the state of development of plasma and the state of introduction of $NF_3$ gas in the two respective processing steps. As shown in (c) of FIG. 4, in the present embodiment, plasma is developed before introduction of $NF_3$ gas and is continued for a while after introduction of $NF_3$ gas has been stopped.

As described above, in the present embodiment, in order to prevent $NF_3$ gas from being evacuated without being decomposed, gas other than the cleaning gas; for example, $H_2$ gas, which is less likely to damage the interior of the film deposition chamber 11 as a result of plasma development is introduced, and plasma is developed substantially simultaneously with introduction of $H_2$ gas.

During a period in which $NF_3$ gas is introduced into the film deposition chamber 11, plasma is inevitably developed, to thereby prevent evacuation of $NF_3$ gas that has not been decomposed.

Therefore, there is eliminated a necessity for providing the dedicated $NF_3$ gas decomposer downstream of the CVD system 10 in the plant decomposing system.

FIG. 7 is a conceptual view showing the outline of the structure of the plant decomposing system utilizing the second embodiment. As shown in FIG. 7, gas is evacuated from the CVD system 10 through use of the pump 21, and the thus-evacuated gas can be sent directly to the plant-wide decomposer 23.

According to the second embodiment, evacuation of the cleaning gas that is required to be decomposed can be prevented during the cleaning of the film deposition chamber, thus reducing the toxicity of exhaust gas.

Further, there can be eliminated a necessity for a dedicated gas decomposer specifically designed for the type of cleaning gas and provided downstream the CVD system.

The plant decomposing system does not require a dedicated gas decomposer of composers for individual film deposition system, thus contributing to a reduction facility costs.

Third Embodiment

A third embodiment of the present invention will be described in comparison with a conventional example, in which an application of the present invention to a thermal CVD system for depositing a tungsten (W) film is taken as an example.

Figure 5:
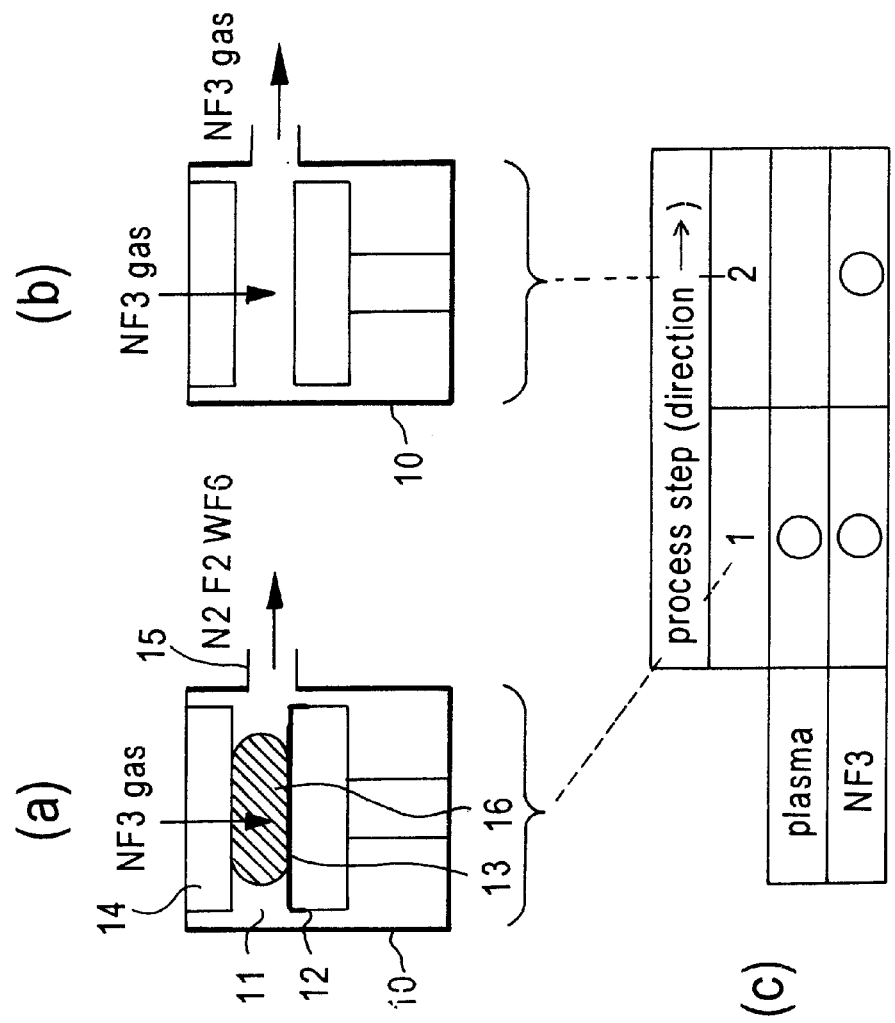
FIGS. 5(a) through (c) show descriptive views for describing a conventional method for cleaning a film deposition chamber, for comparison with a third embodiment of the present invention.

FIG. 5 show descriptive views for describing a conventional method for comparison. Processing is performed in sequence from (a) to (b) in FIG. 5. (c) in FIG. 5 is a table showing comparison of the two respective processing steps in terms of development of plasma and inflow of $NF_3$ gas.

According to the conventional method, after a tungsten film has been deposited on a wafer within the CVD system 10, the wafer having the tungsten film deposited thereon is withdrawn from the CVD system 10.

When the CVD system 10 is cleaned, in step 1 shown in (a) of FIG. 5, $NF_3$ gas is introduced into the film deposition chamber 11 simultaneously with development of plasma 16, so that $NF_3$ gas is decomposed into $N_2$ and $F_2$ ions. The thus-decomposed ions react with tungsten to form $WF_6$ or like compounds. Accordingly, the tungsten film 13 deposited on the heater 12 is decomposed and eliminated, thereby cleaning the film deposition chamber 11.

Subsequently, in step 3 shown in (b) of FIG. 5, development of plasma and introduction of $NF_3$ gas are stopped.

(c) of FIG. 5 is a table showing the state of development of plasma and the state of introduction of $NF_3$ gas in the two respective processing steps. As shown in (c) of FIG. 5, under the conventional method, there is a case where $NF_3$ gas is introduced into the film deposition chamber 11 while no plasma is being developed. In this case, $NF_3$ gas is evacuated from the film deposition chamber 11 by way of the exhaust port 15 without being decomposed.

Therefore, as shown in FIG. 8, the designated $NF_3$ gas decomposer 22 must be provided downstream of the pump 21 which evacuates $NF_3$ gas by means of suction.

In order to eliminate the necessity for the $NF_3$ gas decomposer 22, the present embodiment is directed toward preventing the cleaning gas, such as $NF_3$ gas, from being evacuated without being decomposed.

Figure 6:
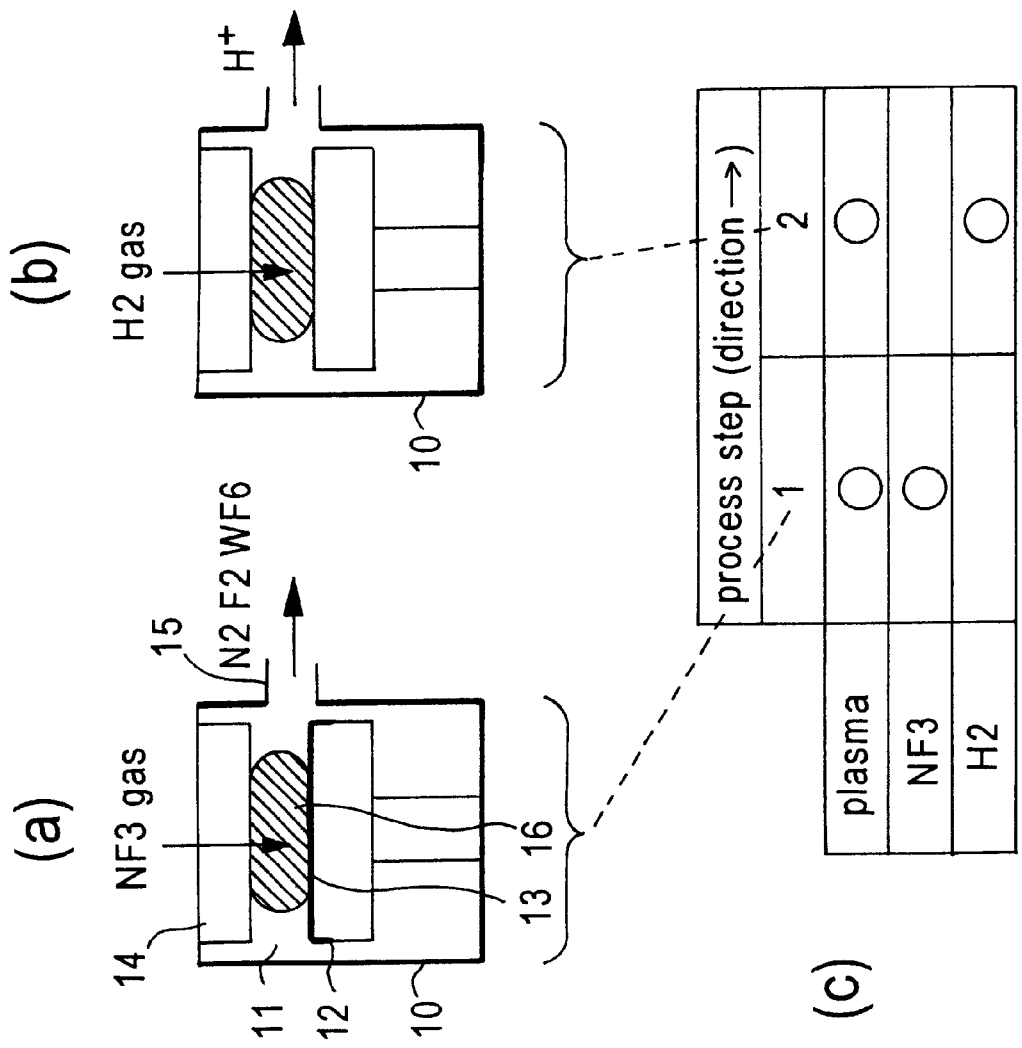
FIGS. 6(a) through (c) show views for describing a method of decomposing a cleaning gas introduced into a film deposition chamber for cleaning the film deposition chamber according to the third embodiment.

FIG. 6 show views for describing a method of eliminating cleaning gas according to the third embodiment.

In the present embodiment, after a tungsten film has been deposited on a wafer within the CVD system 10 prior to a cleaning process, the wafer having the tungsten film deposited thereon is withdrawn from the CVD system 10.

When the CVD system 10 is cleaned in the cleaning process, plasma 16 is developed in step 1 (a preceding process) shown in (a) of FIG. 6. $NF_3$ gas is introduced substantially simultaneously with or immediately after development of plasma 16. As a result of development of plasma 16 in $NF_3$ gas, $NF_3$ gas is decomposed by plasma into $N_2$ and $F_2$ ions. The thus-decomposed ions react with tungsten to form $WF_6$ or like compounds. Accordingly, the tungsten film 13 deposited on the heater 12 is decomposed and eliminated, thereby cleaning the film deposition chamber 11.

Subsequently, in order to terminate the cleaning operation, introduction of $NF_3$ gas is stopped in step 2 (subsequent process) shown in (b) of FIG. 6. $H_2$ gas is introduced into the film deposition chamber 11 in lieu of $NF_3$ gas. The thus-introduced $H_2$ gas is decomposed into $H^+$ ions by means of plasma, and the ions are evacuated. Subsequently, plasma development is stopped when residual $NF_3$ gas that has not reacted is found to have been eliminated.

(c) in FIG. 6 shows the state of development of plasma and the state of introduction of $NF_3$ gas in the two respective processing steps. As shown in (c) of FIG. 6, in the present embodiment, development of plasma is continued even after introduction of $NF_3$ gas has been stopped, whereby $NF_3$ gas is completely decomposed.

As described above, in the present embodiment, in order to prevent $NF_3$ gas from being evacuated without being decomposed, $NF_3$ gas is introduced substantially simulta-neously with development of plasma. After introduction of $NF_3$ gas has been stopped subsequent to completion of the cleaning operation, there is introduced gas other than the cleaning gas; for example, $H_2$ gas, which is less likely to damage the interior of the film deposition chamber 11 as a result of plasma.

During a period in which $NF_3$ gas is introduced into the film deposition chamber 11, plasma is inevitably developed, to thereby prevent evacuation of $NF_3$ gas that has not been decomposed.

Therefore, there is eliminated a necessity for providing the respective dedicated $NF_3$ gas decomposer downstream of the CVD system 10 in the plant decomposing system.

FIG. 7 is a conceptual view showing the outline of the structure of the plant decomposing system utilizing the third embodiment. As shown in FIG. 7, gas is evacuated from the CVD system 10 through use of the pump 21, and the thus-evacuated gas can be sent directly to the plant-wide decomposer 23.

Thus, according to the third embodiment, there can be prevented evacuation of the cleaning gas that is required to be decomposed during the cleaning of the film deposition chamber, thus reducing the toxicity of exhaust gas.

Further, there can be eliminated a necessity for a dedicated gas decomposer specifically designed for the type of cleaning gas and provided downstream of the CVD system respectively.

Thus, the plant decomposing system does not require a dedicated gas decomposer respectively, thus contributing to a reduction in facility costs.

In summary, the present invention embodied in the manner as mentioned above yields the following advantages results.

According to the present invention, there can be prevented evacuation of cleaning gas which is required to be decomposed during the cleaning of the film deposition chamber, thus reducing the toxicity of exhaust gas.

Further, there can be eliminated a necessity for a dedicated gas decomposer specifically designed for the type of cleaning gas and provided downstream of the CVD system respectively.

The plant decomposing system does not require a dedicated gas decomposer respectively, thus contributing to a reduction in facility costs.

Obviously many modifications and variations of the present invention are possible in the light of the above teachings. It is therefore to be understood that within the scope of the appended claims the invention may by practiced otherwise than as specifically described.

The entire disclosure of a Japanese Patent Application No. 11-167343, filed on Jun. 14, 1999 including specification, claims, drawings and summary, on which the Convention priority of the present application is based, are incorporated herein by reference in its entirety.

I claim:

1. A method of decomposing a cleaning gas introduced into a film deposition chamber comprising:
    a preliminary process, in which a predetermined gas is introduced into said film deposition chamber and a plasma is developed before introduction of a cleaning gas, said predetermined gas being different from said cleaning gas and being not required to be decomposed for evacuation; and
    a main process subsequent to said preliminary process, in which said cleaning gas is introduced into the said film deposition chamber, and plasma is developed to decompose the cleaning gas for cleaning a deposited film in said film deposition chamber, whereby said cleaning gas is evacuated while being substantially totally decomposed.

2. The method of decomposing a cleaning gas introduced into a film deposition chamber according to claim 1, wherein a $NF_3$ gas is used as said cleaning gas, to thereby eliminate a tungsten film deposited in said film deposition chamber.

3. The method of decomposing a cleaning gas introduced into a film deposition chamber according to claim 1, wherein a $H_2$ gas is used as said predetermined gas differing from said cleaning gas.

4. A method of decomposing a cleaning gas introduced into a film deposition chamber comprising:

> a main process, in which said cleaning gas is introduced into the said film deposition chamber substantially simultaneously with or immediately after development of plasma, the plasma decomposing the cleaning gas for cleaning a deposited film in said film deposition chamber, and
>
> a subsequent process, in which a predetermined gas is introduced into said film deposition chamber and development of plasma is continued subsequent to said main process, said predetermined gas being different from said cleaning gas and being not required to be decomposed for evacuation, whereby said cleaning gas is evacuated while being substantially totally decomposed.

5. The method of decomposing a cleaning gas introduced into a film deposition chamber according to claim 4, wherein a $NF_3$ gas is used as said cleaning gas, to thereby eliminate a tungsten film deposited in said film deposition chamber.

6. The method of decomposing a cleaning gas introduced into a film deposition chamber according to claim 4, wherein a $H_2$ gas is used as said predetermined gas differing from said cleaning gas.

7. The method of decomposing a cleaning gas introduced into a film deposition chamber according to claim 1, further comprising:

> a subsequent process, in which a predetermined gas is introduced into said film deposition chamber and development of plasma is continued subsequent to said main process, said predetermined gas being different from said cleaning gas and being not required to be decomposed for evacuation, whereby said cleaning gas is evacuated while being substantially totally decomposed.

8. The method of decomposing a cleaning gas introduced into a film deposition chamber according to claim 7, wherein a $NF_3$ gas is used as said cleaning gas, to thereby eliminate a tungsten film deposited in said film deposition chamber.

9. The method of decomposing a cleaning gas introduced into a film deposition chamber according to claim 7, wherein a $H_2$ gas is used as said predetermined gas differing from said cleaning gas.

* * * * *